(12) United States Patent
Honda et al.

(10) Patent No.: US 9,545,847 B2
(45) Date of Patent: Jan. 17, 2017

(54) VEHICLE

(71) Applicant: TOYOTA JIDOSHA KABUSHIKI KAISHA, Toyota-shi, Aichi-ken (JP)

(72) Inventors: Tomoaki Honda, Gotenba (JP); Toshio Inoue, Gotenba (JP); Shunsuke Fushiki, Susono (JP); Keita Fukui, Fujinomiya (JP); Hidekazu Nawata, Gotenba (JP); Yuta Niwa, Mishima (JP); Taichi Osawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/568,340

(22) Filed: Dec. 12, 2014

(65) Prior Publication Data

US 2015/0175008 A1 Jun. 25, 2015

(30) Foreign Application Priority Data

Dec. 24, 2013 (JP) .................................. 2013-265612

(51) Int. Cl.
*B60L 3/00* (2006.01)
*B60L 11/12* (2006.01)
(Continued)

(52) U.S. Cl.
CPC ................ *B60L 3/00* (2013.01); *B60L 11/123* (2013.01); *B60L 11/14* (2013.01); *B60L 11/1816* (2013.01); *B60L 11/1842* (2013.01); *B60L 11/1862* (2013.01); *B60W 10/06* (2013.01); *B60W 10/30* (2013.01); *B60W 20/00* (2013.01); *B60L 2240/36* (2013.01); *B60L 2240/445* (2013.01); *B60L 2240/547* (2013.01); *B60L 2240/549* (2013.01); *B60L 2240/622* (2013.01); *B60L 2240/80* (2013.01); *B60L 2250/16* (2013.01); *B60W 2550/00* (2013.01);
(Continued)

(58) Field of Classification Search
CPC .......... B60L 3/00; B60L 11/123; B60W 10/06
See application file for complete search history.

(56) References Cited

U.S. PATENT DOCUMENTS

| 5,150,034 A | 9/1992 | Kyoukane et al. |
| 2010/0087973 A1* | 4/2010 | Kaita .................... B60K 6/445 701/22 |

FOREIGN PATENT DOCUMENTS

| JP | H03-143201 A | 6/1991 |
| JP | 8-228405 | 9/1996 |

(Continued)

*Primary Examiner* — Basil T Jos
(74) *Attorney, Agent, or Firm* — Finnegan, Henderson, Farabow, Garrett & Dunner, LLP

(57) ABSTRACT

Vehicle is configured to supply power to outside of a vehicle. Vehicle includes an engine, a battery, a first MG configured to generate power with use of motive power of the engine, a switching unit configured to switch power supplied to outside of the vehicle between power generated by the first MG and power stored in the battery, an ECU configured to control the switching unit, and a detection unit configured to allow the ECU to determine whether or not the vehicle is located indoors. When the ECU determines that the vehicle is located indoors based on an output from the detection unit, it controls the switching unit so that the power supplied to outside of the vehicle to be switched from power generated by the first MG to power stored in the battery.

6 Claims, 9 Drawing Sheets

(51) Int. Cl.
  *B60W 10/06* (2006.01)
  *B60L 11/18* (2006.01)
  *B60W 10/30* (2006.01)
  *B60W 20/00* (2016.01)
  *B60L 11/14* (2006.01)

(52) U.S. Cl.
  CPC ......... *Y02E 60/721* (2013.01); *Y02T 10/6217* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01); *Y10S 903/93* (2013.01)

(56) References Cited

FOREIGN PATENT DOCUMENTS

| | | |
|---|---|---|
| JP | 2002-256959 A | 9/2002 |
| JP | 2007-236023 A | 9/2007 |
| JP | 2008-295136 | 12/2008 |
| JP | 2011-229276 | 11/2011 |
| JP | 2012-19607 | 1/2012 |
| JP | 2012-233409 A | 11/2012 |
| JP | 2013-99035 | 5/2013 |
| WO | WO 2011/132054 A2 | 10/2011 |

\* cited by examiner

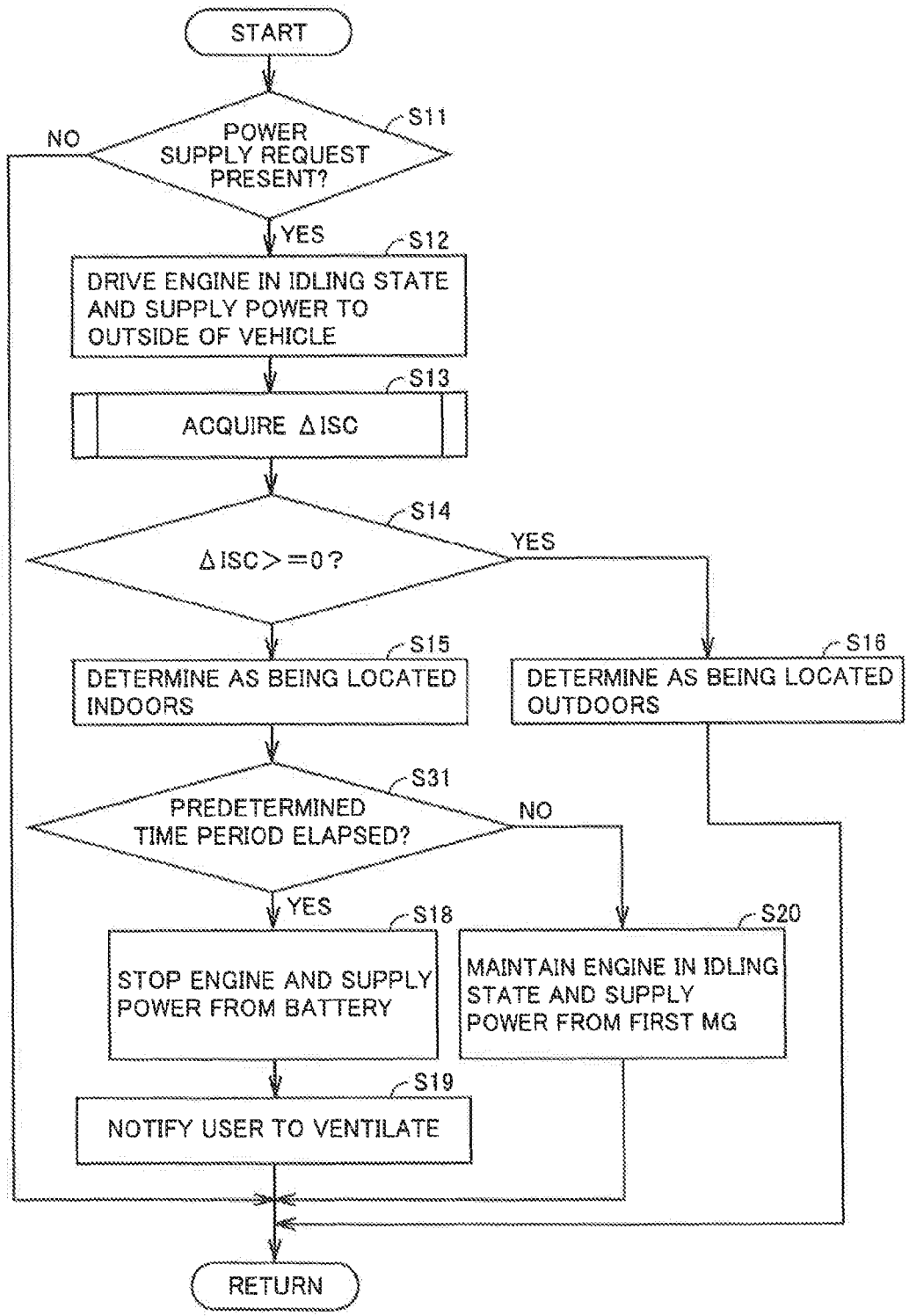

VEHICLE

This nonprovisional application is based on Japanese Patent Application No. 2013-265612 filed on Dec. 24, 2013 with the Japan Patent Office, the entire contents of which are hereby incorporated by reference.

BACKGROUND OF THE INVENTION

Field of the Invention

The present invention relates to a vehicle, and more particularly to a vehicle configured to supply power to outside of the vehicle.

Description of the Background Art

There has been proposed a vehicle including a sensor for determining whether or not a vehicle is located indoors. In such a vehicle, different controls can be performed depending on either the vehicle is located indoors or outdoors. For example, an electrically-powered vehicle disclosed in Japanese Patent Laying-Open No. 8-228405 includes an environment detection sensor for detecting the vehicle's indoor/outdoor locations. A control unit of this vehicle drives an engine when it receives an outdoor signal from the environment detection sensor. On the other hand, the control unit stops the engine when it receives an indoor signal from the environment detection sensor. Japanese Patent Laying-Open No. 8-228405 discloses that the environment detection sensor includes an illuminance detector and a wind velocity detector.

SUMMARY OF THE INVENTION

In recent years, a plug-in hybrid vehicle is commercially available which is configured such that a vehicle-mounted battery can be charged from a commercial power supply. For the plug-in hybrid vehicle, it has been proposed to supply power to electrical equipment, a power network, or the like provided outside of the vehicle.

When power is generated using motive power of an engine during a supply of power to outside of a vehicle, exhaust gas is discharged. Therefore, in the case where the vehicle is located in an indoor space, there is a possibility that the exhaust gas fills the indoor space. When the indoor space is filled with the exhaust gas, an indoor oxygen concentration is lowered, so that a combustion state of the engine is deteriorated. To suppress further generation of the exhaust gas, it would be necessary to stop the engine. However, if the engine is stopped, a supply of power to outside of the vehicle cannot be continued.

The present invention was made to solve the problem described above, and its object is to provide a vehicle capable of continuing a supply of power for a long time period when a supply of power to outside of the vehicle is performed in an indoor space.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flowchart for explanation of the processes executed by the control device in a vehicle according to a third embodiment.

DESCRIPTION OF THE PREFERRED EMBODIMENTS

Figure 1:
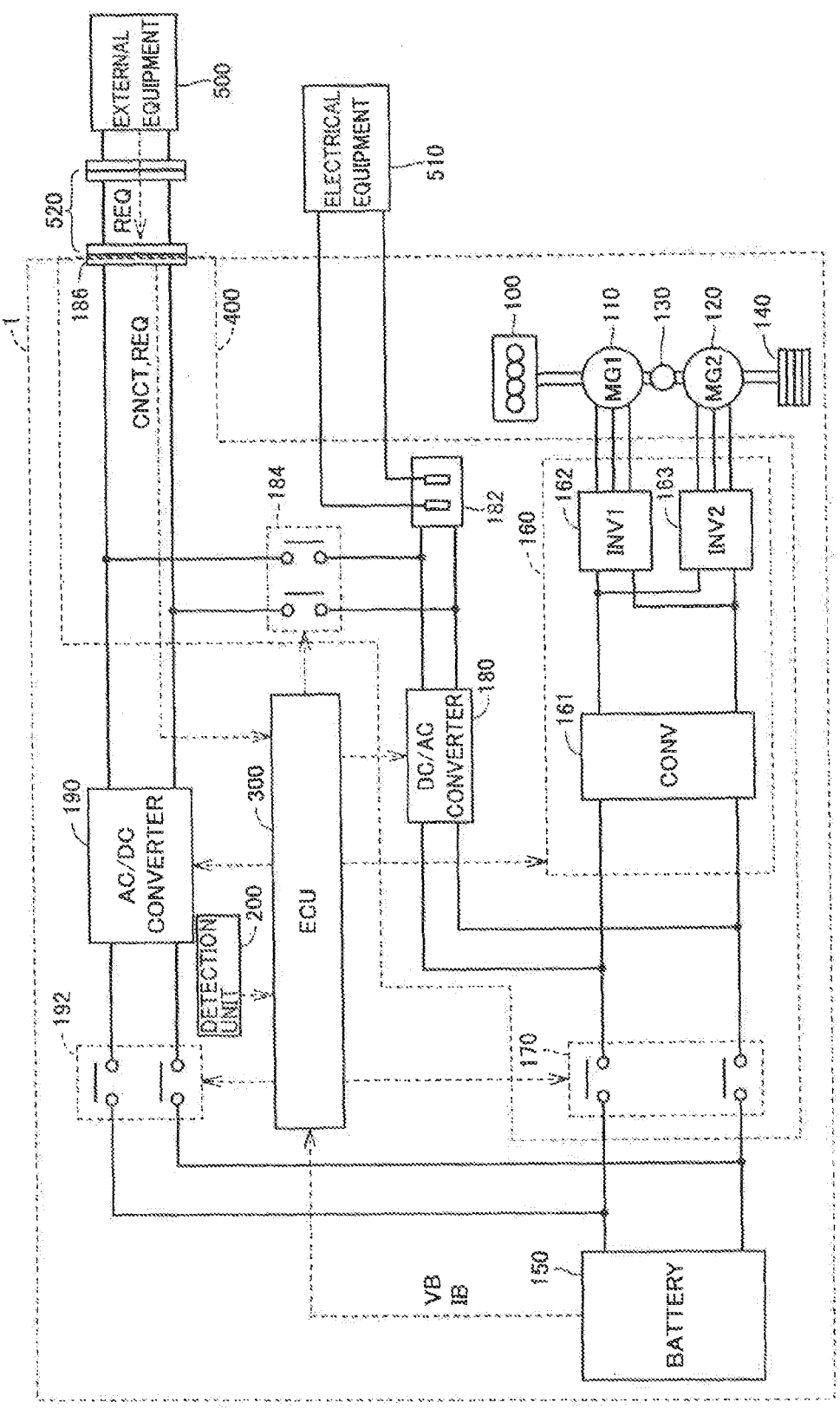
FIG. 1 is a block diagram schematically representing a configuration of a vehicle according to a first embodiment of the present invention.

In the following, embodiments of the present invention will be described in detail with reference to the drawings. It should be noted that the same or corresponding parts in the drawings have the same reference numerals allotted, and description thereof will not be repeated.

In the embodiments of the present invention, the term "indoor" refers to a space where sufficient ventilation is not performed. In other words, the term "indoor" refers to a space where a concentration of exhaust gas increases as the exhaust gas is discharged, so that the oxygen concentration is lowered. In the following description, a case where a vehicle is parked in a closed garage is described as one exemplary situation of the case where the vehicle is located in an "indoor" space. However, the "indoor" space is not limited to this.

First Embodiment

FIG. 1 is a block diagram schematically representing a configuration of a vehicle according to the first embodiment of the present invention. Referring to FIG. 1, a vehicle 1 is a plug-in hybrid vehicle configured to charge a vehicle-mounted battery from outside of the vehicle. Vehicle 1 is configured to supply power to external equipment 500 and electrical equipment 510 provided outside of the vehicle. External equipment 500 and electrical equipment 510 are not limited as long as they are equipment operated with use of power from vehicle 1.

Vehicle 1 includes an engine 100, a first MG (Motor Generator) 110, a second MG 120, a power split mechanism 130, drive wheels 140, a battery 150, a detection unit 200, an ECU (Electronic Control Unit) 300, and a switching unit 400. Switching unit 400 includes a PCU (Power Control Unit) 160 and an SMR (System Main Relay) 170.

ECU 300 is a control device for controlling vehicle 1. ECU 300 receives a signal from each sensor or the like, which will be described later, and outputs a control signal to constituting elements of vehicle 1. Engine 100 is an internal combustion engine such as a gasoline engine, a diesel engine, or the like. Detection unit 200 will be described later in detail.

Battery 150 (power storage device) is a direct-current power supply configured to be chargeable and dischargeable. For battery 150, a rechargeable battery such as a lithium-ion battery or a nickel hydride battery, or a capacitor such as an electrical double layer capacitor may be employed, for example. Battery 150 includes a voltage sensor and a current sensor (neither illustrated in the drawings). The voltage sensor and current sensor respectively detect a voltage VB and a current IB of battery 150. Each sensor outputs a signal indicating a detection result to ECU 300. ECU 300 calculates a state of charge (SOC) of battery 150 based on the signal from each sensor.

PCU 160 drives first MG 110 and second MG 120. PCU 160 includes a converter 161 and inverters 162, 163. Converter 161 raises a direct-current voltage supplied from battery 150 based on a control signal from ECU 300. The raised direct-current voltage is supplied to inverters 162, 163. Each of inverter 162, 163 converts direct-current power from converter 161 into alternate-current power based on a control signal from ECU 300. The alternate-current power converted by inverter 162, 163 is supplied to first MG 110 and second MG 120, respectively.

First MG 110 uses the alternate-current power converted by inverter 162 to rotate a crank shaft (not illustrated in the drawings) of engine 100. Accordingly, first MG 110 starts engine 100. Moreover, the drive force generated by first MG 110 is transmitted to drive wheels 140 through power split mechanism 130. Further, first MG 110 generates power with use of the motive power of engine 100 split by power split mechanism 130. The alternate-current power generated by first MG 110 can be converted into direct-current power at PCU 160. Accordingly, battery 150 is charged.

Second MG 120 uses at least one of the alternate-current power from inverter 163 and alternate-current power generated by first MG 110 to provide a drive force to drive wheels 140. Moreover, second MG 120 generates power through regenerative braking. The alternate-current power generated by second MG 120 can be converted into direct-current power at PCU 160. Accordingly, battery 150 is charged.

SMR 170 is electrically connected between battery 150 and PCU 160. SMR 170 switches supplying and blocking of power between battery 150 and PCU 160 based on a control signal from ECU 300.

Switching unit 400 switches power supplied to outside of the vehicle between power generated by first MG 110 and power stored in battery 150. Switching unit 400 further includes, as a configuration for supplying power to outside of the vehicle, a DC/AC converter 180, an outlet 182, a relay 184, and a connecting unit 186.

DC/AC converter 180 converts direct-current power from battery 150 or PCU 160 into alternate-current power based on a control signal from ECU 300. The alternate-current power converted by DC/AC converter 180 is supplied to outlet 182, and is supplied to connecting unit 186 through relay 184. Outlet 182 is provided, for example, in a cabin of vehicle 1. A power plug (not illustrated in the drawings) of electrical equipment 510 is inserted to outlet 182. Relay 184 is electrically connected between DC/AC converter 180 and connecting unit 186. Relay 184 switches supplying and blocking of alternate-current power from DC/AC converter 180 to connecting unit 186 based on a control signal from ECU 300.

Connecting unit 186 is, for example, a dedicated connector, and is provided on an outer surface of vehicle 1. The alternate-current power from vehicle 1 is supplied to external equipment 500 through connecting unit 186 and a connection cable 520. Connection cable 520 includes a connection detection unit (not illustrated in the drawings). When connection cable 520 is connected to connecting unit 186, the connection detection unit outputs a connection signal CNCT to ECU 300. When ECU 300 receives connection signal CNCT, it determines that connection cable 520 is connected to connecting unit 186. Further, external equipment 500 outputs a power supply request signal REQ when a supply of power is necessary. Power supply request signal REQ is transmitted to ECU 300 through connection cable 520 and connecting unit 186. When ECU 300 receives power supply request signal REQ, it determines that a power supply request from external equipment 500 is in an ON state.

On the other hand, when battery 150 is charged, an alternate-current power supply (not illustrated in the drawings) in place of external equipment 500 is electrically connected to connecting unit 186. The alternate-current power supply is, for example, a commercial power supply. As a configuration for charging battery 150 from outside of the vehicle, vehicle 1 further includes an AC/DC converter 190 and a relay 192.

AC/DC converter 190 converts alternate-current power from connecting unit 186 into direct-current power based on a control signal from ECU 300. Accordingly, battery 150 is charged. Relay 192 is electrically connected between AC/DC converter 190 and battery 150. Relay 192 switches supplying and blocking of direct-current power from AC/DC converter 190 to battery 150 based on a control signal from ECU 300.

Figure 2:
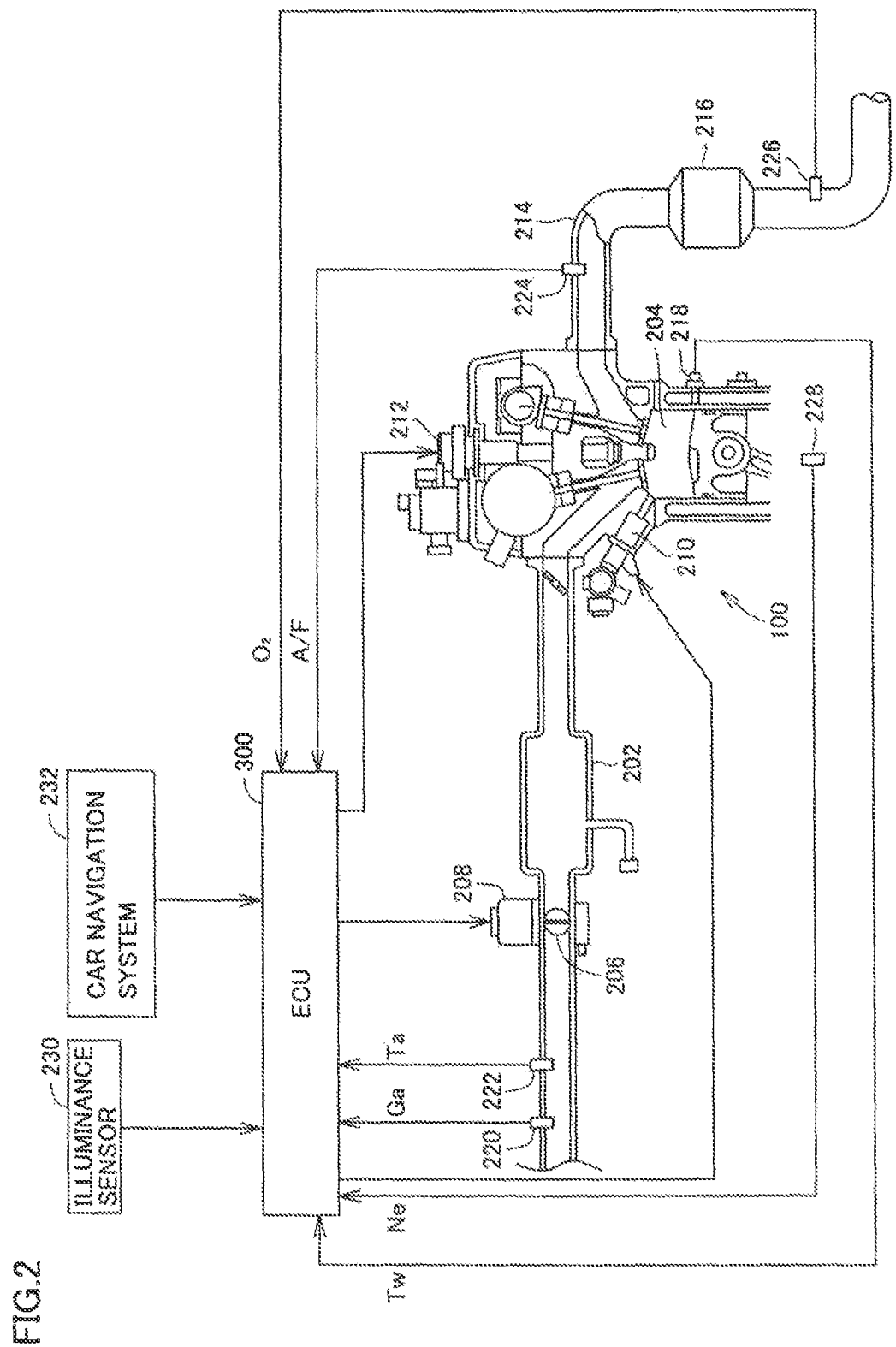
FIG. 2 is represents a detailed configuration of an internal combustion engine shown in FIG. 1.

FIG. 2 represents details of the configuration of engine 100 shown in FIG. 1. Referring to FIG. 2, in engine 100, air is taken through an air cleaner (not illustrated in the drawings). The taken air (intake air) flows through an intake pipe 202 and is introduced to a combustion chamber 204. The amount of air introduced to combustion chamber 204 is determined in accordance with the operation amount of a throttle valve 206 (throttle opening degree THR). Throttle opening degree THR is adjusted by a throttle motor 208 based on a control signal from ECU 300. The adjustment of throttle opening degree THR will be described later in detail.

Fuel is injected by a fuel pump (not illustrated in the drawings) from an injector 210 into combustion chamber 204. An air-fuel mixture of the air flowing through intake pipe 202 and the fuel injected from injector 210 is ignited by ignition coil 212 and combusted. The air-fuel mixture after combustion (exhaust gas) is discharged to outside of the vehicle through a catalyst 216 provided on an exhaust pipe 214. Catalyst 216 is a three-way catalyst configured to purify the emission (toxic substances such as hydrocarbon (HC), carbon monoxide (CO), nitrogen oxides (NOx), and the like) contained in the exhaust gas.

Vehicle 1 includes detection unit 200 (refer to FIG. 1) for allowing ECU 300 to determine whether or not vehicle 1 is located indoors. Detection unit 200 includes an engine water temperature sensor 218, an air flow meter 220, an intake air temperature sensor 222, an air-fuel ratio sensor 224, an oxygen sensor 226, and an engine rotation speed sensor 228. Further, detection unit 200 includes an illuminance sensor 230 and a car navigation system 232.

Engine water temperature sensor 218 detects a temperature Tw of coolant water of engine 100. Air flow meter 220 detects an intake air amount (the amount of air taken into engine 100 per unit time) Ga. Intake air temperature sensor 222 detects a temperature Ta of intake air. Air-fuel ratio sensor 224 detects a ratio A/F of air and fuel in the exhaust gas. Oxygen sensor 226 detects an oxygen concentration $O_2$ in the exhaust gas. Engine rotation speed sensor 228 detects an engine rotation speed Ne. Illuminance sensor 230 is arranged at a location such as directly under a front window of vehicle 1 where sun light can be received, and detects an illuminance Lx of sun light. Car navigation system 232 obtains location information of vehicle 1. Each sensor outputs a signal indicating a detection result to ECU 300.

ECU 300 controls throttle motor 208 so as to have an appropriate throttle opening degree THR based on a signal from each sensor. Further, based on a signal from each sensor, ECU 300 controls injector 210 so as to have an appropriate fuel injection amount, and controls ignition coil 212 so as to have an appropriate ignition timing.

Generally in an engine, an ISC (Idle Speed Control) is always performed. The ISC control is a control of maintaining engine rotation speed Ne within a range of a target idling rotation speed Nisc in an idle state.

Figure 3:
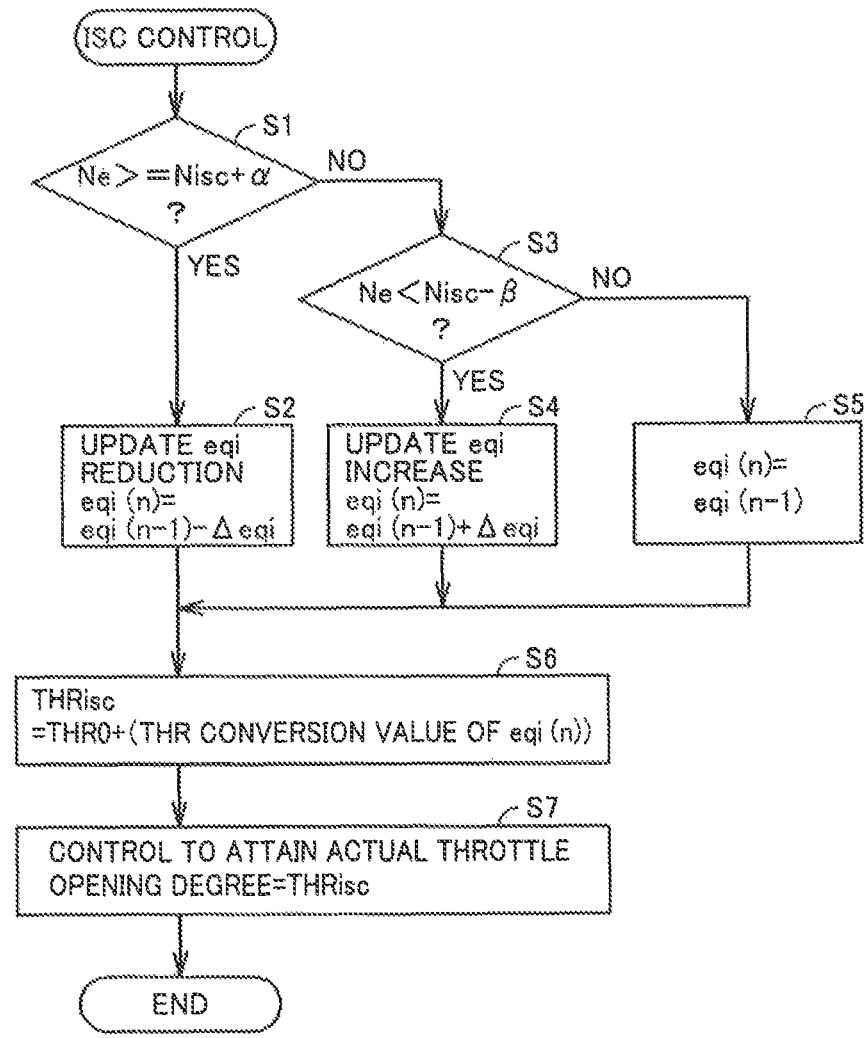
FIG. 3 is a flowchart representing processes executed by a control device when an ISC control is performed.

FIG. 3 is a flowchart representing the processes executed by ECU 300 in the case of performing the ISC control. Referring to FIG. 3, ECU 300 compares engine rotation speed Ne with target idling speed Nisc, and calculates an ISC feedback amount eqi in accordance with a comparison result. ISC feedback amount eqi is expressed by an intake air amount per unit time (unit: L/s). The above-described range of the target idling speed Nisc is expressed by Nisc-$\beta$<Ne<Nisc+$\alpha$ ($\alpha$, $\beta$: predetermined values).

When Ne>=Nisc+$\alpha$ is provided (YES in step S1), ECU 300 reduces ISC feedback amount eqi by an updated amount $\Delta$eqi in step S2. In other words, ECU 300 calculates a present value eqi(n) of the ISC feedback amount by subtracting updated amount $\Delta$eqi from a previous value eqi(n-1) of the ISC feedback amount.

When Ne<Nisc-$\beta$ is provided (YES in step S3), ECU 300 increases ISC feedback amount eqi by updated amount $\Delta$eqi in step S4. In other words, ECU 300 calculates a present value eqi(n) of the ISC feedback amount by adding updated amount $\Delta$eqi to previous value eqi(n-1) of the ISC feedback amount.

When Nisc-$\beta$<=Ne<Nisc+$\alpha$ is provided (NO in step S3), ECU 300 does not update ISC feedback amount eqi in step S5. In other words, ECU 300 calculates previous value eqi(n-1) of the ISC feedback amount to use it directly as present value eqi(n) of the ISC feedback amount.

In step S6, ECU 300 sets a value obtained by adding a throttle opening degree conversion value of ISC feedback amount eqi to a predetermined initial target throttle opening degree THR0 as a target throttle opening degree THRisc. The throttle opening degree conversion value of ISC feedback amount eqi is a value obtained by converting ISC feedback amount eqi(unit: L/s) into a throttle angle (unit: deg).

In step S7, ECU 300 controls throttle motor 208 so that an actual throttle opening degree THR attains a target throttle opening degree THRisc. As described above, ECU 300 performs the feedback control of throttle opening degree THR so that engine rotation speed Ne is always maintained within target idling speed Nisc.

In addition to the description above, ECU 300 in the first embodiment uses ISC feedback amount eqi to determine whether or not an oxygen concentration outside of the vehicle is lowered. Moreover, ECU 300 also determines whether or not vehicle 1 is located indoors. The reason why such determination can be made based on ISC feedback amount eqi will be described in the following.

In the case where vehicle 1 is parked indoors (for example, in a closed garage), when driving of engine 100 causes exhaust gas to be discharged, the indoor oxygen concentration is lowered. Therefore, to maintain engine rotation speed Ne to be constant, an intake air amount larger than that at the time of starting of a supply of power is required. Thus, ECU 300 increases throttle opening degree THR to be greater than that at the time of starting of a supply of power. In other words, ECU 300 increases ISC feedback amount eqi to be greater than that at the time of starting of a supply of power.

On the contrary, in the case where vehicle 1 is parked outdoors, even when driving of vehicle 100 causes the exhaust gas to be discharged, the oxygen concentration in the atmospheric air substantially does not change. Therefore, engine rotation speed Ne can be maintained constant with the intake air amount which is approximately equal to that at the time of starting of a supply of power. Thus, ECU 300 maintains throttle opening degree THR from starting of a supply of power. In other words, ECU 300 does not update ISC feedback amount eqi.

As described above, the changed amount in ISC feedback amount eqi from starting of a supply of power increases as the oxygen concentration outside of the vehicle is lowered. In other words, the output from detection unit 200 includes the output which is increased or decreased in accordance with the oxygen concentration outside of the vehicle. Thus, ECU 300 can determine whether or not vehicle 1 is located indoors based on the changed amount of ISC feedback amount eqi.

More in detail, when ISC feedback amount eqi is increased to be greater than that at the time of starting of a supply of power (YES in step S1 in FIG. 3), ECU 300 determines that the oxygen concentration outside of the vehicle is lowered. Accordingly, ECU 300 can determine that vehicle 1 is located indoors. On the other hand, when ISC feedback amount eqi substantially does not change as compared to that at the time of starting of a supply of power even if power is supplied to outside of the vehicle (NO in step S3 of FIG. 3), ECU 300 determines that the oxygen concentration outside of the vehicle is constant. Accordingly, ECU 300 can determine that vehicle 1 is located outdoors.

Figure 4:
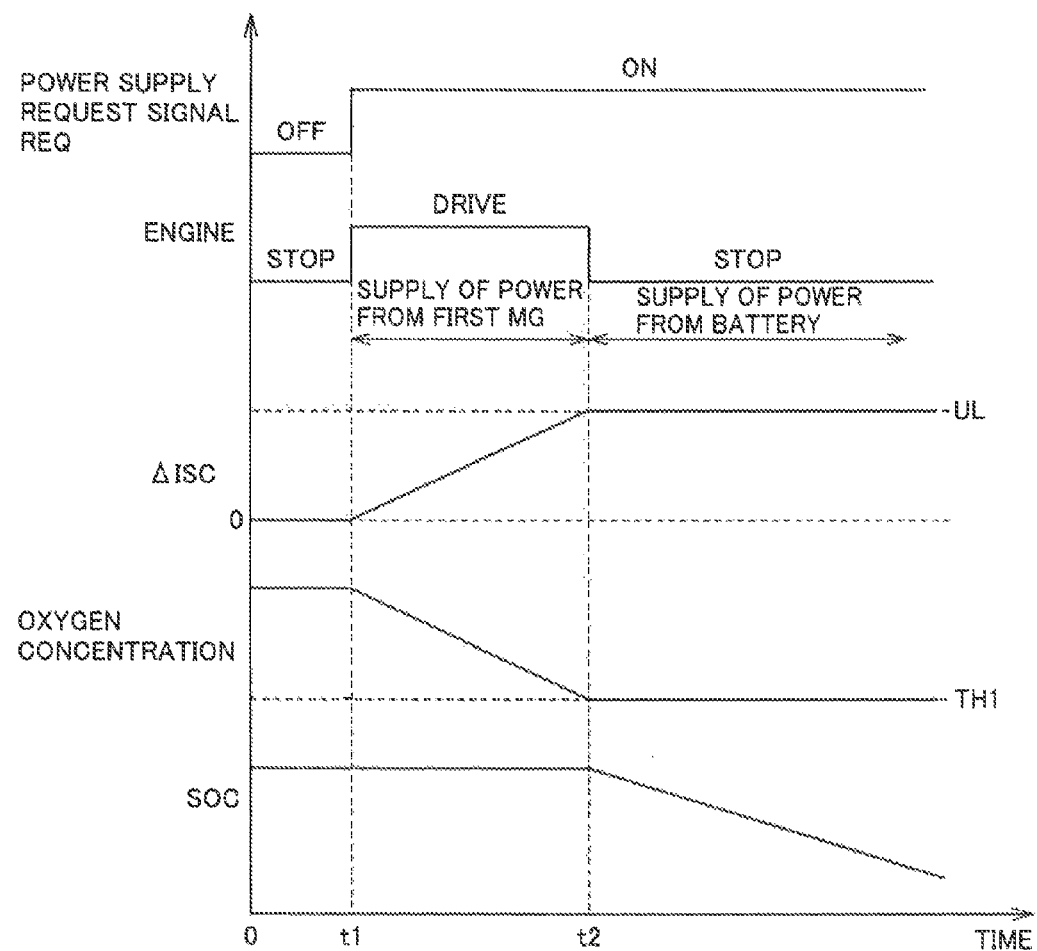
FIG. 4 is a timing chart for explanation of a supply of power to outside of the vehicle shown in FIG. 1.

FIG. 4 is a timing chart for explanation of a supply of power to outside of the vehicle in the case of the vehicle shown in FIG. 1. Referring to FIG. 4, the horizontal axis represents a time axis. The vertical axis represents ON/OFF of power supply request REQ from external equipment 500, driving/stopping of engine 100, changed amount $\Delta$ISC of the ISC feedback amount from starting of a supply of power (hereinafter, simply referred to as changed amount $\Delta$ISC), the oxygen concentration in a garage, and an SOC of battery 150.

Changed amount $\Delta$ISC of the ISC feedback amount has a preset upper limit value UL. Upper limit value UL is appropriately set so that the combustion state of engine 100 is maintained in a favorable state. As mentioned above, changed amount $\Delta$ISC of the ISC feedback amount increases as the oxygen concentration outside of the vehicle is lowered. Thus, an increase in changed amount $\Delta$ISC up to upper limit value UL indicates that the oxygen concentration in a garage is lowered to a threshold value TH1 (first threshold value). As described above, a signal from detection unit 200 is increased or decreased in accordance with the oxygen concentration outside of the vehicle.

At a reference time (0), power supply request signal REQ is in an OFF state. Therefore, engine 100 is stopped.

At a time elapsed by t1 from the reference time (hereinafter, referred to as time t1, and it similarly applies to other times), power supply request signal REQ is switched from the OFF state to the ON state. Accordingly, engine 100 is driven, and power generated by first MG 110 is supplied to external equipment 500. Moreover, driving of engine 100 causes the exhaust gas to be discharged. Therefore, changed amount ΔISC of the ISC feedback amount increases gradually. This indicates that the oxygen concentration in the garage is lowered.

At time t2, changed amount ΔISC of the ISC feedback amount reaches upper limit value UL. This indicates that the oxygen concentration in the garage has reached threshold value TH1. Accordingly, engine 100 is stopped, and power stored in battery 150 is supplied to external equipment 500. Stopping of engine 100 suppresses further discharging of the exhaust gas. Therefore, on or after time t2, the oxygen concentration in the garage is maintained constant.

Figure 5:
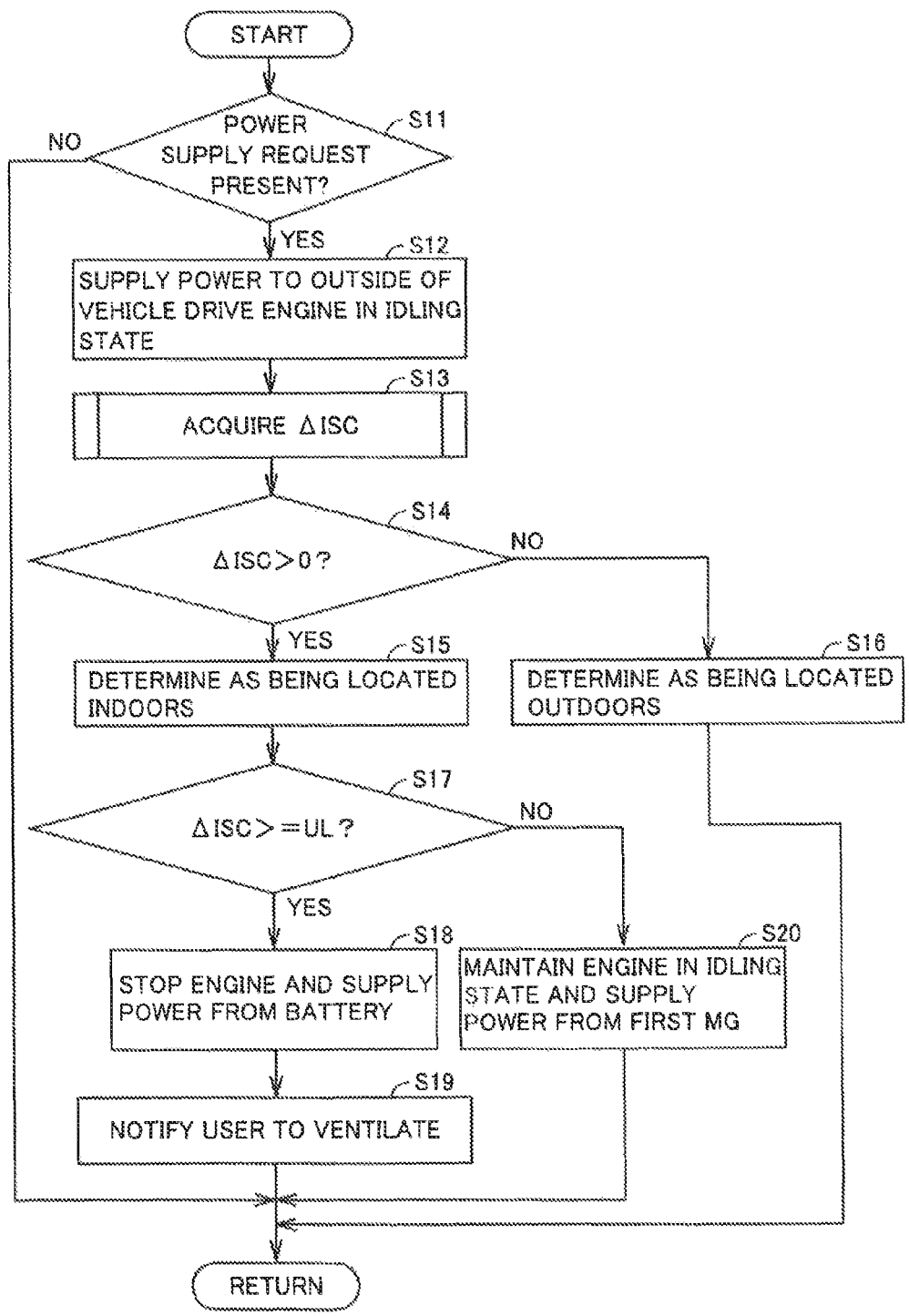
FIG. 5 is a flowchart for explanation of the processes executed by the control device in the timing chart shown in FIG. 4.

FIG. 5 is a flowchart for explanation of the processes performed by ECU 300 in the timing chart shown in FIG. 4. Referring to FIG. 5, the processes shown in this flowchart are executed when, for example, ECU 300 detects a connection of connection cable 520 to connecting unit 186.

In step S11, ECU 300 determines whether or not a power supply request is present based on power supply request signal REQ. When the power supply request is present (YES in step S11), the process proceeds to step S12. On the other hand, when no power supply request is present (NO in step S11), the process once returns to the main routine, and the series of processes shown in FIG. 5 are repeated.

In step S12, ECU 300 performs a supply of power to outside of the vehicle, and controls engine 100 to drive in the idling state. Thereafter, the process proceeds to step S13.

In step S13, ECU 300 acquires changed amount ΔISC of the ISC feedback amount.

Figure 6:
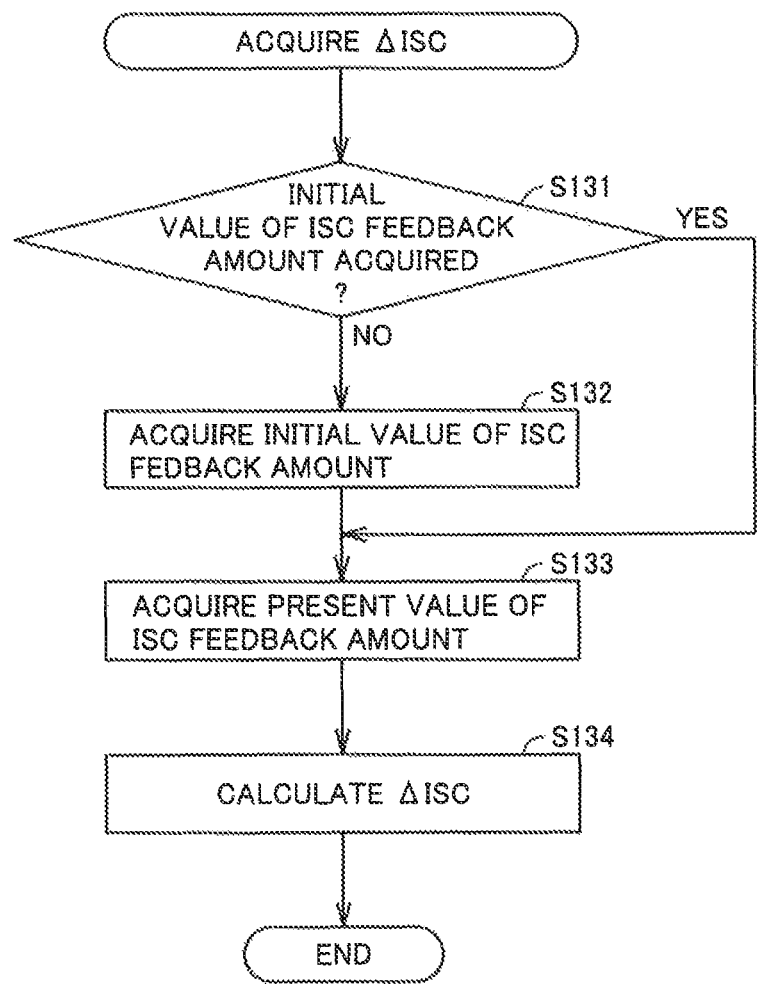
FIG. 6 is a flowchart for explanation of details of the processes of acquiring a changed amount of an ISC feedback amount shown in FIG. 5.

FIG. 6 is a flowchart for explanation of details of the process of acquiring changed amount ΔISC of the ISC feedback amount shown in FIG. 5 (the process of step S13). Referring to FIG. 6, in step S131, ECU 300 determines whether or not ISC feedback amount eqi(t1) at the time of starting of a supply of power (refer to time t1 of FIG. 4) has already been acquired. In the case where ISC feedback amount eqi(t1) at the time of starting of a supply of power has already been acquired (YES in step S131), the process proceeds to step S133. On the other hand, in the case where ISC feedback amount eqi(t1) at the time of starting of a supply of power has not been acquired (NO in step S131), the process proceeds to step S132.

In step S132, ECU 300 acquires ISC feedback amount eqi(t1) at the time of starting of a supply of power. Thereafter, the process proceeds to step S133. In step S133, ECU 300 acquires ISC feedback amount eqi(t) at time t (t1<t<=t2). Thereafter, the process proceeds to step S134.

In step S134, ECU 300 calculates charged amount ΔISC of the ISC feedback amount. More specifically, a difference between ISC feedback amount eqi(t) at time t and ISC feedback amount eqi(t1) at the time of starting of a supply of power is set as changed amount ΔISC (ΔISC=eqi(t)−eqi(t1)). When the calculation of changed amount ΔISC is completed, the process proceeds to step S14.

Referring back to FIG. 5, in step S14, ECU 300 determines whether or not changed amount ΔISC of the ISC feedback amount is increased from the time of starting of a supply of power. In the case where changed amount ΔISC is increased (YES in step S14), the process proceeds to step S15.

In step S15, ECU 300 determines that vehicle 1 is located indoors. In other words, in the case where a signal (output) from detection unit 200 indicates that the oxygen concentration is lowered from starting of a supply of power to outside of vehicle by the power generated by first MG 110, ECU 300 determines that vehicle 1 is located indoors. Thereafter, the process proceeds to step S17.

On the contrary, in the case where changed amount ΔISC has not increased in step S14 (NO in step S14), the process proceeds to step S16. In step S16, ECU 300 determines that vehicle 1 is located outdoors. Thereafter, the series of processes shown in FIG. 5 are repeated.

In step S17, ECU 300 determines whether or not changed amount ΔISC of the ISC feedback amount is greater than or equal to upper limit value UL. In the case where changed amount ΔISC is greater than or equal to upper limit value UL (YES in step S17), the process proceeds to step S18.

In step S18, ECU 300 controls engine 100 so that engine 100 stops, and controls switching unit 400 to supply the power stored in battery 150 to outside of the vehicle. Thereafter, the process proceeds to step S19.

In step S19, ECU 300 notifies a user to ventilate the garage. As a method of notification, a method such as generating an alarming sound or a voice message, turning on a notifying light (not illustrated in the drawings), or sending a message to a mobile phone of a user can be employed. When a user receives notification and performs ventilation, the oxygen concentration in the garage increases. Consequently, engine 100 can be driven again. Moreover, in the case where the engine is driven again, the combustion state of the engine can be improved. Thereafter, the process once returns to the main routine, and the series of processes shown in FIG. 5 are repeated again.

On the other hand, when changed amount ΔISC is less than upper limit value UL in step S17 (NO in step S17), the process proceeds to step S20. In step S20, ECU 300 controls engine 100 to maintain the idling state, and controls switching unit 400 to supply power generated by first MG 110 to outside of the vehicle. Thereafter, the series of processes shown in FIG. 5 are repeated.

As described above, according to the first embodiment, when changed amount ΔISC of the ISC feedback amount has reached upper limit value UL, in other words, when the indoor oxygen concentration has reached threshold value TH1, ECU 300 stops engine 100. Accordingly, since discharging of the exhaust gas is suppressed, further lowering of the indoor oxygen concentration can be prevented. Thus, further deterioration of the combustion state of engine 100 can be prevented. Moreover, a concurrent use of a supply of power from first MG 110 and a supply of power from battery 150 allows continuous supply of power for a long period of time.

In the first embodiment, the case has been described in which changed amount ΔISC of the ISC feedback amount is calculated with the time of starting a supply of power as a reference. However, the time as a reference for calculation of changed amount ΔISC is not limited to the time of starting a supply of power. Changed amount ΔISC can be calculated by comparing a size relationship between the ISC feedback amount at any time on or after starting of a supply of power and the ISC feedback amount at a time after that time of former. Moreover, the comparison of the size relationship described above is not limited to the one based on a difference (eqi(t)−eqi(t1)), but may be the one based on, for example, a ratio (eqi(t)/eqi(t1)).

Second Embodiment

In the second embodiment, the battery is charged prior to stopping of the engine. Since the configuration of the vehicle according to the second embodiment is the same as the configuration of vehicle 1 (refer to FIGS. 1 and 2), description thereof will not be repeated.

Figure 7:
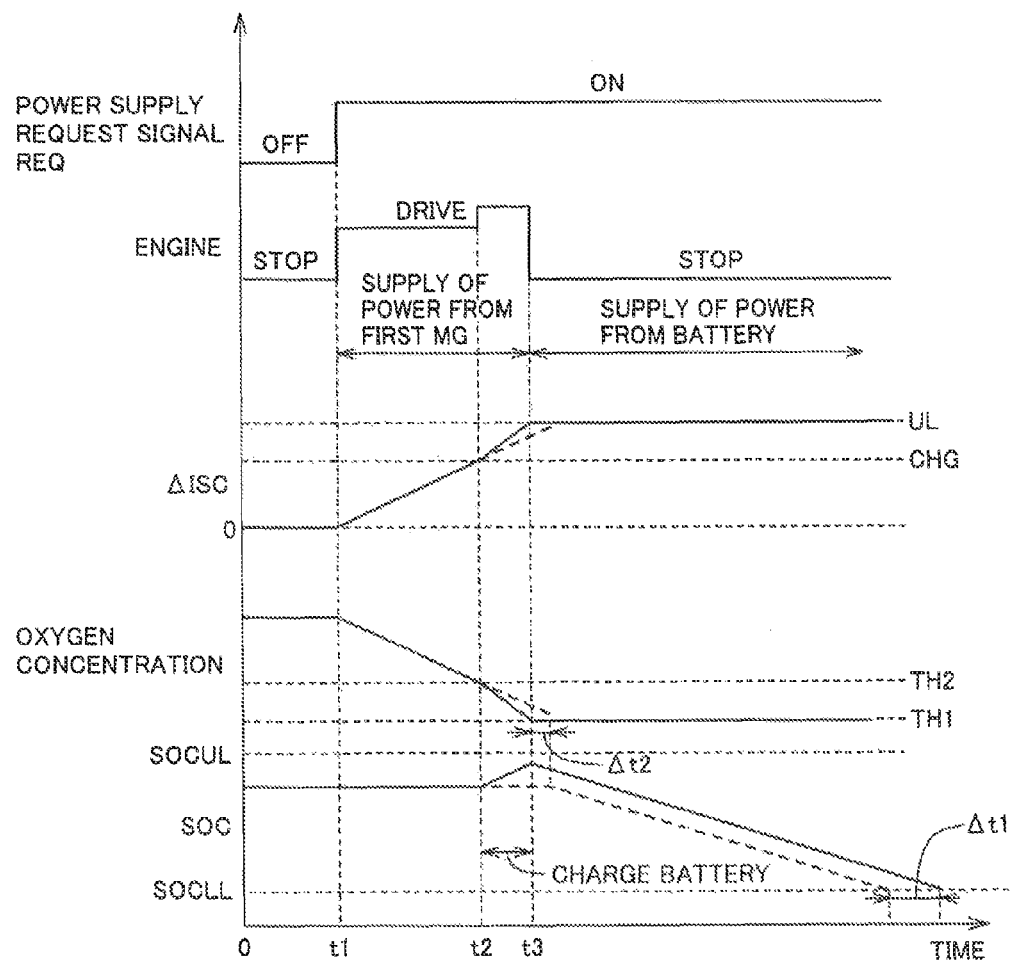
FIG. 7 is a timing chart for explanation of a supply of power to outside of a vehicle according to a second embodiment.

FIG. 7 is a timing chart for explanation of a supply of power to outside of a vehicle in the vehicle according to the second embodiment. Referring to FIG. 7, FIG. 7 is compared with FIG. 4.

In the second embodiment, in addition to upper limit value UL of changed amount ΔISC of the ISC feedback amount, a set value CHG for starting of charging battery 150 is defined. Set value UL2 corresponds to a threshold value TH2 (second threshold value) of the oxygen concentration. Since set value UL2 is lower than upper limit value UL, threshold value TH2 is higher than threshold value TH1.

For each of ISC feedback amount ΔISC, oxygen concentration, and SOC, the behavior with the control of the second embodiment is indicated by a solid line, and the behavior with the control of the first embodiment is indicated by a broken line for comparison. Since the control up to time t1 is the same as the control up to time t1 in FIG. 4, description thereof will not be repeated.

At time t2, changed amount ΔISC of the ISC feedback amount reaches set value CHG. In other words, the oxygen concentration in the garage reaches threshold value TH2. ECU 300 controls engine 100 so that the driving state of engine 100 shifts to a higher load side than the driving state up to time t1. Accordingly, the power generation amount at first MG 110 becomes greater than the requested power supply amount from external equipment 500. The power amount corresponding to the difference between the power generation amount and requested power supply amount charges battery 150. Thus, the SOC of battery 150 increases.

At time t3, changed amount ΔISC of the ISC feedback amount reaches upper limit value UL. In other words, the oxygen concentration in the garage reaches threshold value TH1. Accordingly, engine 100 is stopped, and power stored in battery 150 is supplied to external equipment 500. In the second embodiment, since battery 150 is charged in advance, a time period in which power can be supplied from battery 150 (the time period during which the SOC is lowered to a lower limit value SOCLL) becomes longer. The amount of increase during the period in which power can be supplied from battery 150 is represented by Δt1 in the drawings.

On the other hand, in the time period between time t2 and time t3, as compared to the time period up to time t2, the driving state of engine 100 is shifted to the high load side. Therefore, the amount of exhaust gas discharged per unit time becomes greater. Thus, in the second embodiment, since lowering of the oxygen concentration in the garage becomes faster as compared to the first embodiment, the time (time t3) at which changed amount ΔISC reaches upper limit value UL becomes earlier. In other words, the period in which engine 100 can be driven becomes shorter. The amount of reduction of the period during which engine 100 can be driven is expressed by Δt2 in the drawings.

To set the period in which the power can be supplied to outside of the vehicle to be longer, it would be necessary that increased amount Δt1 of the period in which the power can be supplied from battery 150 is longer than the reduced amount Δt2 of the period in which engine 100 can be driven (Δt1>Δt2). Engine 100 is preferably driven at a best point of power generation efficiency (the amount of fuel consumption of engine 100 required for generating a predetermined amount of power at first MG 110) (best engine efficiency point). However, there is a case where driving cannot be at the best engine efficiency point between time t1 and time t2 depending on the amount of power requested from outside of the vehicle.

Therefore, engine 100 is driven at the best engine efficiency point during a period between time t2 and time t3. Accordingly, the discharged amount of exhaust gas can be suppressed to be as small as possible to shorten the period of Δt2. Moreover, since a large amount of power can be charged to battery 150, the period of Δt1 can be made longer. As a matter of course, engine 100 can be driven at the best engine efficiency point also during the period between time t1 and time t2.

Figure 8:
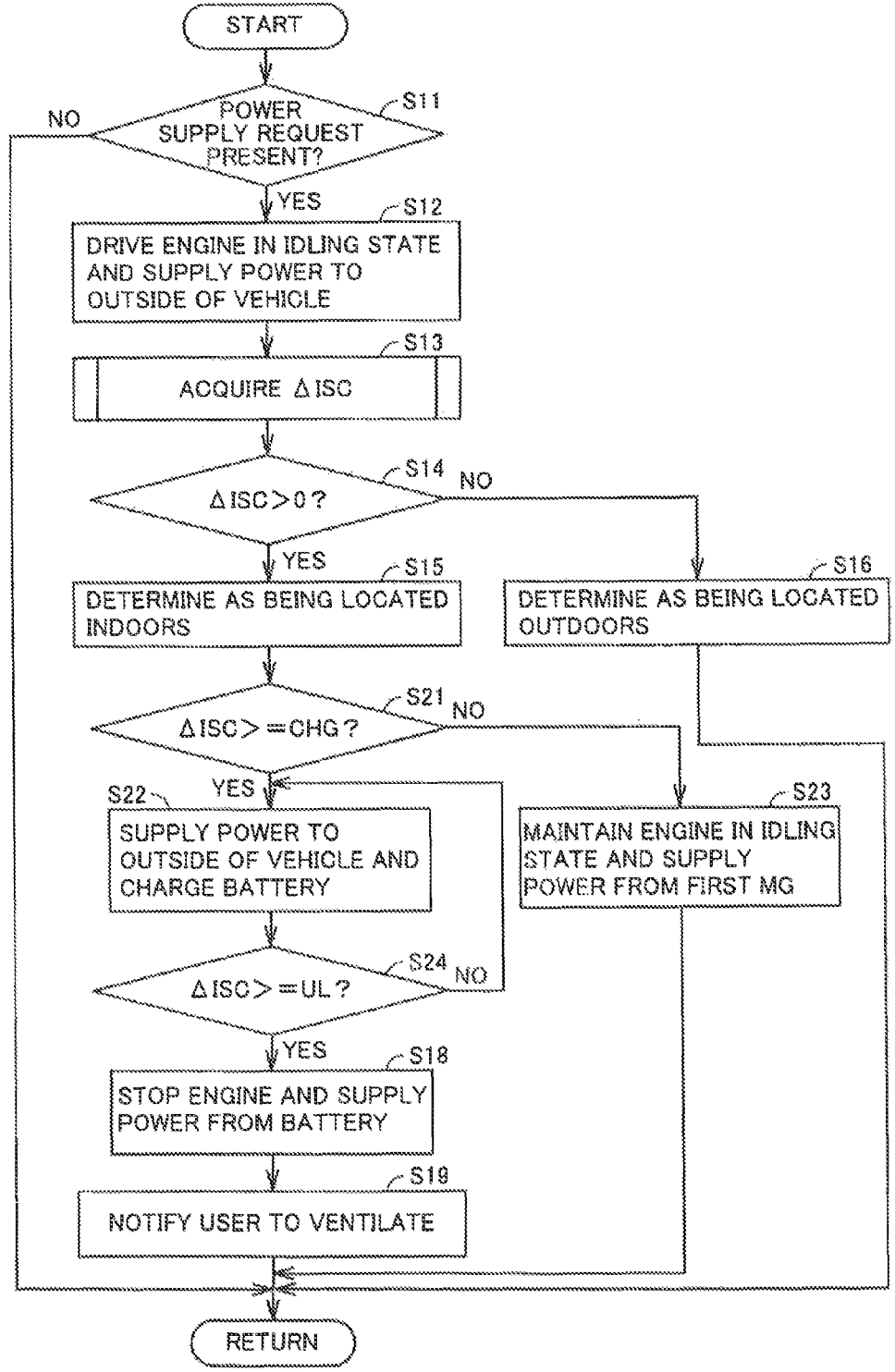
FIG. 8 is a flowchart for explanation of the processes executed by the control device in the timing chart shown in FIG. 7.

FIG. 8 is a flowchart for explanation of the process performed by the control device in the timing chart shown in FIG. 7. Referring to FIG. 8, since the processes of steps S11 to S16 are the same as the processes of steps S11 to S16 in FIG. 5, description thereof will not be repeated.

In step S21, ECU 300 determines whether or not changed amount ΔISC of the ISC feedback amount is equal to or greater than set value CHG. When changed amount ΔISC is greater than or equal to set value CHG (when set value CHG<=ΔISC<=upper limit value UL is provided, YES in step S21), the process proceeds to step S22. On the other hand, when changed amount ΔISC is less than set value CHG (NO in step S21), the process proceeds to step S23.

In step S23, ECU 300 controls engine 100 to maintain the idling state, and controls switching unit 400 to supply power generated by first MG 110 to outside of the vehicle. Thereafter, the process once returns to the main routine, and the series of processes shown in FIG. 8 are repeated.

In step S22, ECU 300 controls engine 100 so that a load state of engine 100 is shifted to the high load side. In other words, when the oxygen concentration is greater than or equal to threshold value TH1 and less than or equal to threshold value TH2, ECU 300 controls switching unit 400 so that the power generated by first MG 110 is stored in battery 150. Accordingly, battery 150 is charged.

When the SOC has reached an upper limit value SOCUL (refer to FIG. 7), it is preferable that engine 100 is controlled so that the driving state of engine 100 returns to an original state (a state where the amount of power generated by first MG 110 and the amount of power requested from external equipment 500 are equal) to prevent overcharging of battery 150. Thereafter, the process proceeds to step S24.

In step S24, ECU 300 determines whether or not changed amount ΔISC of the ISC feedback amount is greater than or equal to upper limit value UL. When changed amount ΔISC is greater than or equal to upper limit value UL (YES in step S24), the step proceeds to step S18. On the other hand, when changed amount ΔISC is less than upper limit value UL (in other words, when set value CHG<=ΔISC<=upper limit value UL is provided, NO in step S24), the process returns to step S22.

In step S18, ECU 300 controls engine 100 so that engine 100 stops, and controls switching unit 400 to supply power to outside of the vehicle from battery 150.

Thereafter, the process once returns to the main routine, and the series of processes shown in FIG. 8 are repeated again.

As described above, according to the second embodiment, the power is stored in advance in battery 150 before stopping engine 100, so that a supply of power to outside of vehicle can be continued for a longer period of time than in the first embodiment.

In the first and second embodiments, explanation was made on the case of using changed amount ΔISC of the ISC feedback amount from starting of a supply of power for determination of whether or not the vehicle is located indoors and whether or not the oxygen concentration is lowered. However, the amount which can be used for the determination described above is not limited to the ISC feedback amount.

Describing with a specific example, ECU 300 can determine whether or not vehicle 1 is located indoors based on illuminance Lx measured at illuminance sensor 230 or location information acquired at car navigation system 232. Moreover, combining these information as needed can improve the accuracy of determination.

Further, for the determination on whether or not the oxygen concentration is lowered, a signal from the air-fuel ratio sensor can be used, for example. In other words, when the signal from the air-fuel ratio sensor is changed to a direction indicating a state of the air-fuel mixture thinner than the theoretical air-fuel ratio (lean) after starting of a supply of power, or when the air-fuel ratio feedback amount is changed to the rich direction after starting of a supply of power, ECU 300 can determine that the oxygen concentration is lowered. Consequently, ECU 300 can determine that the vehicle is located indoors.

Third Embodiment

In the third embodiment, when a predetermined time period has elapsed after starting of a supply of power to outside of the vehicle by the output generated by the first MG, the supply of power is switched to the supply of power by the power stored in the battery. Since the configuration of the vehicle according to the third embodiment is the same as the configuration of vehicle 1 (refer to FIGS. 1 and 2), description thereof will not be repeated.

FIG. 9 is a flowchart for explanation of the process by ECU 300 in the vehicle according to the third embodiment. Referring to FIG. 9, since the processes up to step S16 are the same as the processes up to step S16 in FIG. 5, description thereof will not be repeated.

In step S31, ECU 300 determines whether or not a predetermined time period has elapsed after starting of a supply of power to outside of the vehicle by the output generated by first MG 110, in other words, whether or not a predetermined time period has elapsed after starting driving of engine 100. When the predetermined time period has elapsed (YES in step S31), the process proceeds to step S18. On the other hand, when the predetermined time period has not elapsed (NO in step S31), the process proceeds to step S20. Since the processes in steps S18 to S20 are the same as the processes of steps S18 to S20 in FIG. 5, description thereof will not be repeated.

According to the third embodiment, when it is determined that the vehicle is located indoors, and a predetermined time period has elapsed after starting of a supply of power to outside of the vehicle by the power generated by first MG 110, ECU 300 controls switching unit 400 so that the power supplied to outside of the vehicle is switched to power stored in battery 150 from the power generated by first MG 110. As described above, by determining the presence or absence of the exhaust gas filling an indoor space based on the elapsed time period from starting of a supply of power, the supply of power from first MG 110 can be switched to the supply of power from battery 150 without performing complex calculation.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle configured to supply power to outside of the vehicle, comprising:
   an internal combustion engine;
   a power storage device;
   a power generator configured to generate power with use of motive power of said internal combustion engine;
   a switching unit configured to switch power supplied to outside of the vehicle between power generated by said power generator and power stored in said power storage device;
   a control device configured to control said switching unit; and
   a detection unit configured to allow said control device to determine whether or not said vehicle is located indoors,
   said control device, when determined that said vehicle is located indoors based on an output from said detection unit, controlling said switching unit so that power supplied to outside of said vehicle is switched from power generated by said power generator to power stored in said power storage device.

2. The vehicle according to claim 1, wherein when said control device determines that said vehicle is located indoors, and when a predetermined time period has elapsed after starting of a supply of power to outside of said vehicle using power generated by said power generator, said control device controls said switching unit so that power supplied to outside of said vehicle is switched from power generated by said power generator to power stored in said power storage device.

3. The vehicle according to claim 1, wherein an output from said detection unit includes an output which is increased and decreased in accordance with an oxygen concentration outside of said vehicle, and
   when an output from said detection unit indicates that said oxygen concentration is lowered after starting of a supply of power to outside of said vehicle using power generated by power generator, said control device determines that said vehicle is located indoors.

4. The vehicle according to claim 3, wherein when said vehicle is located indoors, and when said oxygen concentration has reached a first threshold value (TH1), said control device controls said switching unit so that power supplied to outside of said vehicle is switched from power generated by said power generator to power stored in said power storage device.

5. The vehicle according to claim 4, wherein said switching unit is configured to switch power generated by said power generator to be stored in said power storage device, and
   when said oxygen concentration is greater than or equal to said first threshold value and less than or equal to a second threshold value which is higher than said first threshold value, said control device controls said switching unit so that power generated by said power generator is stored in said power storage device.

6. The vehicle according to claim 3, wherein said detection unit includes an air flow meter, and
   said control device executes a feedback control of a throttle opening degree of said internal combustion engine so that a rotating speed of said internal combustion engine attains a target speed in accordance with an air amount indicated by an output from said air flow meter in an idling state of said internal combustion engine, and said control device determines that said oxygen concentration is reduced when said throttle opening degree is increased as a result of said feedback control.

* * * * *